US012078325B1

(12) United States Patent
Tanner et al.

(10) Patent No.: US 12,078,325 B1
(45) Date of Patent: Sep. 3, 2024

(54) METHODS AND SYSTEMS OF ELECTRIC LIGHTING

(71) Applicant: Spark Trim LLC, Highland, UT (US)

(72) Inventors: Dustin John Tanner, Highland, UT (US); Kris Nosack, Orem, UT (US)

(73) Assignee: Spark Trim LLC, Highland, UT (US)

(*) Notice: Subject to any disclaimer, the term of this patent is extended or adjusted under 35 U.S.C. 154(b) by 0 days.

(21) Appl. No.: 18/363,221

(22) Filed: Aug. 1, 2023

Related U.S. Application Data

(60) Provisional application No. 63/370,057, filed on Aug. 1, 2022.

(51) Int. Cl.

| | |
|---|---|
| ***F21V 21/005*** | (2006.01) |
| ***F21S 2/00*** | (2016.01) |
| ***F21S 4/20*** | (2016.01) |
| ***F21V 21/088*** | (2006.01) |
| ***F21V 23/00*** | (2015.01) |
| ***F21V 23/06*** | (2006.01) |
| ***F21V 31/00*** | (2006.01) |
| ***F21W 131/107*** | (2006.01) |
| ***F21Y 103/30*** | (2016.01) |

(52) U.S. Cl.
CPC ............ *F21V 21/005* (2013.01); *F21S 2/005* (2013.01); *F21S 4/20* (2016.01); *F21V 21/088* (2013.01); *F21V 23/001* (2013.01); *F21V 23/005* (2013.01); *F21V 23/06* (2013.01); *F21V 31/005* (2013.01); *F21W 2131/107* (2013.01); *F21Y 2103/30* (2016.08)

(58) Field of Classification Search
CPC ........ F21S 4/20; F21S 4/22; F21S 4/24; F21S 4/26; F21V 23/06; F21V 31/00; F21V 31/005
See application file for complete search history.

(56) References Cited

U.S. PATENT DOCUMENTS

| | | | | |
|---|---|---|---|---|
| 8,714,772 B1* | 5/2014 | Levante | F21V 23/06 362/249.02 |
| 9,647,349 B1* | 5/2017 | Stillman | H01R 4/2433 |
| 2003/0045147 A1* | 3/2003 | Huang | H01R 13/44 439/226 |
| 2010/0277098 A1* | 11/2010 | Sarna | F21S 4/28 362/555 |
| 2010/0277908 A1* | 11/2010 | Hu | F21V 5/00 362/249.02 |
| 2012/0092875 A1* | 4/2012 | Cho | F21S 4/28 362/362 |

(Continued)

FOREIGN PATENT DOCUMENTS

| | | | |
|---|---|---|---|
| CN | 114110464 A * | 3/2022 | F21S 4/26 |
| DE | 202006011477 U1 * | 10/2006 | F21S 4/20 |

(Continued)

OTHER PUBLICATIONS

"Voltage regulator", Wikipedia, downloaded Mar. 8, 2024 from Internet Archive archived Jul. 11, 2023 (12 pages).

(Continued)

*Primary Examiner* — Alexander K Garlen
(74) *Attorney, Agent, or Firm* — DLA Piper LLP (US)

(57) ABSTRACT

Systems and methods for lighting. Segments can be used. The segments can comprise: a tube, a printed circuit board, and a connector.

30 Claims, 9 Drawing Sheets front section view

(56) References Cited

U.S. PATENT DOCUMENTS

| | | | | |
|---|---|---|---|---|
| 2013/0279160 | A1* | 10/2013 | Myers | F21V 19/001 29/825 |
| 2014/0293646 | A1* | 10/2014 | Iwazaki | F21S 4/28 362/609 |
| 2018/0335200 | A1* | 11/2018 | Jiang | F21V 7/005 |
| 2019/0249851 | A1* | 8/2019 | Ericson, Jr. | H05B 45/48 |

FOREIGN PATENT DOCUMENTS

| | | | | | |
|---|---|---|---|---|---|
| EP | 2687773 | A1 | * | 1/2014 | F21S 4/28 |
| EP | 3988835 | A1 | * | 4/2022 | F21K 9/272 |
| KR | 20120040635 | A | * | 4/2012 | F21S 4/28 |
| KR | 20140094413 | A | * | 7/2014 | F21S 4/28 |
| WO | WO-9814731 | A1 | * | 4/1998 | A62B 3/00 |

OTHER PUBLICATIONS

"Printed Circuit Board", Wikipedia, downloaded Mar. 8, 2024 from Internet Archive archived Jul. 29, 2023 (26 pages).
"Electrical Connector", Wikipedia, downloaded Mar. 8, 2024 from Internet Archive archived Jul. 20, 2023 (14 pages).

* cited by examiner

Isometric view

Isometric view

Front section view top view front section view top view

Front section view

METHODS AND SYSTEMS OF ELECTRIC LIGHTING

CROSS-REFERENCE TO RELATED APPLICATIONS

This application claims the benefit of U.S. Provisional Application No. 63/370,057 filed Aug. 1, 2022, which is incorporated by reference in its entirety.

DESCRIPTION OF EMBODIMENTS OF THE DISCLOSURE

Figure 1:
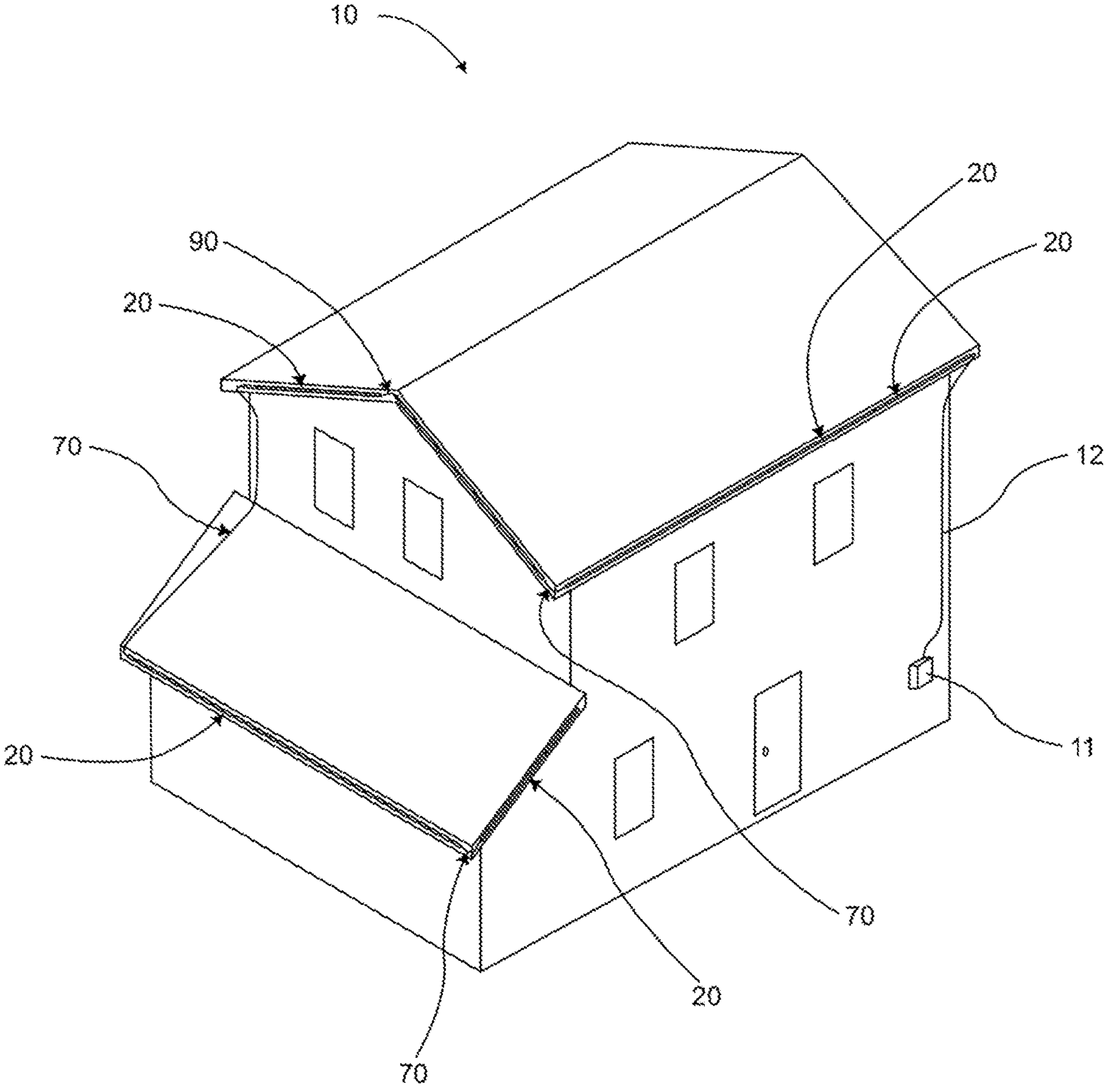
FIG. 1 illustrates an example system of electric lights on an example house, according to aspects of the disclosure.

FIG. 1 illustrates an example system of electric lights that can connect together easily and mount on many surfaces. For example, the lighting in FIG. 1 is an example of lighting that can be used on the edges of house roofs. Lighting segments can be attached to a surface (e.g., wall, roof fascia, soffit, eave, etc.), landscaping elements (e.g., trees, bushes, fences, structures), or other items. The electric lights can create moving (e.g., animated) and/or static lighting. The lighting can be decorative. The lights can be LED lights (e.g., Shenzhen Shining Opto-electronic SK6812RGBW, Wurth Elektronik 15050GS73300, or Quelighting Corp P/N QLSP08RGBW, or other types of LED lights) or other types of electric lights (e.g., incandescent: JKL Components Corp, 8640).

The system can comprise various segments, including at least one power light segment. The segments can conduct all electrical power and signals to the next segment. Each segment can have one male end and one female end to help ensure that the segments are connected in the correct direction. A power light segment can comprise of a voltage reducer and one or more electric lights (e.g., Red/Green/Blue/White LEDs) mounted on a circuit board inside a length of tube. The tube can be translucent. The tube can comprise plastic and/or glass. The tube can comprise other materials known to those of ordinary skill in the art.

The system can have: an example house 10, at least one integrated high power rail (e.g., 12-36 volts) and at least one voltage reducer (e.g., less than 12 volts). The lights can require a certain volt power to operate. A string of lights may only go a certain amount of length (e.g., about 3 meters) before the volt power has diminished to the point that the lights no longer function properly. The system can include a power rail in at least one (or in some embodiments) all segments and/or at least one (or in some embodiments all) cables. Power light segments can include at least one electronic circuit that can convert the power rail down to a lower voltage (e.g., 5 volts) to power the lights of downstream connected segments. One power light segment can drive more than one (e.g., 3, 5, 9, etc.) standard light segments, after which another power light segment can be connected next.

A standard light segment is the same as the power light segment but the voltage reducer is omitted. A standard light segment is powered by an upstream power light segment. A standard light segment can have at least one high power rail to carry high voltage to the next power light segment.

For going around corners and other situations where two strings of segments must be connected, a special extension cable segment can plug into the end of a string of light segments, and then into the beginning of the next string of light segments. The extension cable segment can conduct all electrical power and signals to the next segment.

To make an angle (e.g., for a roof peak) a special peak segment can end with one electric light, and then a cable can exit the other end. One end of the cable (e.g., the male end) from one segment can be plugged into the other end (e.g., the female end) of the next segment. Or the peak segment may be a flexible translucent or clear rubber-like material between two tubes with wires inside to connect to the electric light (see FIG. 14). Using unique ends like male and female ends can help ensure a proper electrical connection. Those of ordinary skill in the art will see that there are many other ways to create unique ends (e.g., color coding, different shapes (e.g., mechanical differences), all male connections with a female-to-female connector, etc.).

Each segment can have a seal. The seal can comprise: an elastomeric (e.g., rubber) and/or a rigid material. Those of ordinary skill in the art will see that many types of materials can be used in the seal. The seal can be put on one end of the segment and an electrical connector can be put on the other end of the segment. This can allow segments to be connected together to form a water-resistant electrical connection.

Each segment can have a latching feature so each segment is held together. The seal may perform this function or a different method such as the hooks and notches shown in FIG. 13.

A controller can provide electrical power and electrical signals to the connected segments to light the lights.

Each segment can be attached to a surface (e.g., wall, roof fascia, soffit, eave). Many types of materials can be used for attaching. Attaching materials can comprise: clips (e.g., using screws or another item or material to attach the clips), or an adhesive, or any other attaching material known by those of ordinary skill in the art, or any combination thereof. For example, each segment can be attached with at least one (e.g., 2, 3, 4, 5, etc.) clip that can grip the plastic tube. A clip can be fastened to the surface with a screw.

As mentioned above, FIG. 1 illustrates an example lighting system installed on a house. The lighting system can comprise any or all of the following components:

11. Controller—this can provide electrical power and/or signals to the connected segments to light the lights.

12. Electrical Cable—this can conduct electrical power and/or control signals to the connected segments.

20. Light Segments—each segment can comprise one or more electric lights (for example: Red/Green/Blue/White LEDs) that can be mounted on a circuit board inside a length of translucent tube.

70. Extension Cables—this can connect segments (e.g., around corners or roof edges).

90. Peak Segment—this can be a segment that ends with one electric light (e.g., at the vertex of the angle, for example the roof peak) and then a cable can exit this end. One end of the cable from one segment can be plugged into the other end of the next segment, as described above.

Figure 2:
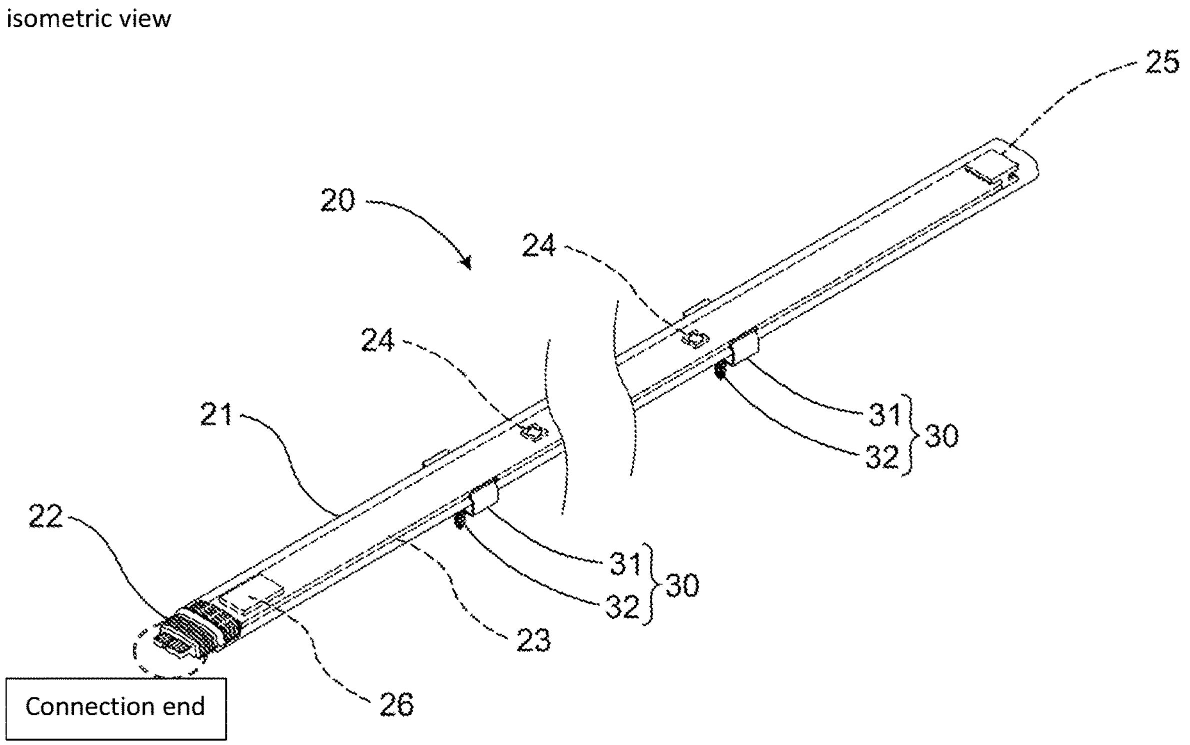
FIG. 2 illustrates an example segment, according to aspects of the disclosure.

FIG. 2 illustrates an example segment, and can comprise at least one of any or all of the following components.

21. Tube—can be a translucent and/or clear material (e.g., plastic) and can protect other interior components, and can allow light from electric lights to shine through.

22. Seal—can prevent water from entering into the tubes.

23. Circuit Board—can be a rigid or flexible electrical insulator with traces that conduct electrical power and/or signals.

24. Electric Lights—can convert electrical power into light (e.g., Red/Green/Blue/White LEDs).

25. Connector (e.g., Kyocera AVX 00-9159-BTB)—can make electrical connections from one circuit board to another circuit board.

26. Voltage Reducer—can reduce the rail power voltage to a level suitable for the electric lights (e.g., 5 Volts).

30. Mounting clip assembly.

31. Mounting clip—can snap onto a tube.

32. Screw—can fastens a clip to a surface (e.g., edge of roof).

Figure 3:
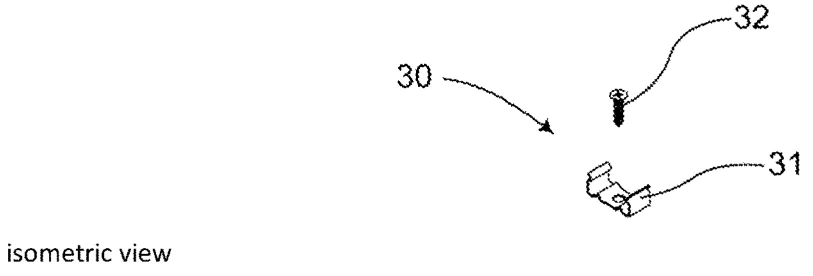
FIG. 3 illustrates an example mounting clip and screw, according to aspects of the disclosure.

FIG. 3 illustrates an example mounting clip and screw. The mounting clip can comprise at least one of any or all of the following components.

31. Mounting Clip—see FIG. 2.

32. Screw—see FIG. 2.

Figure 4:
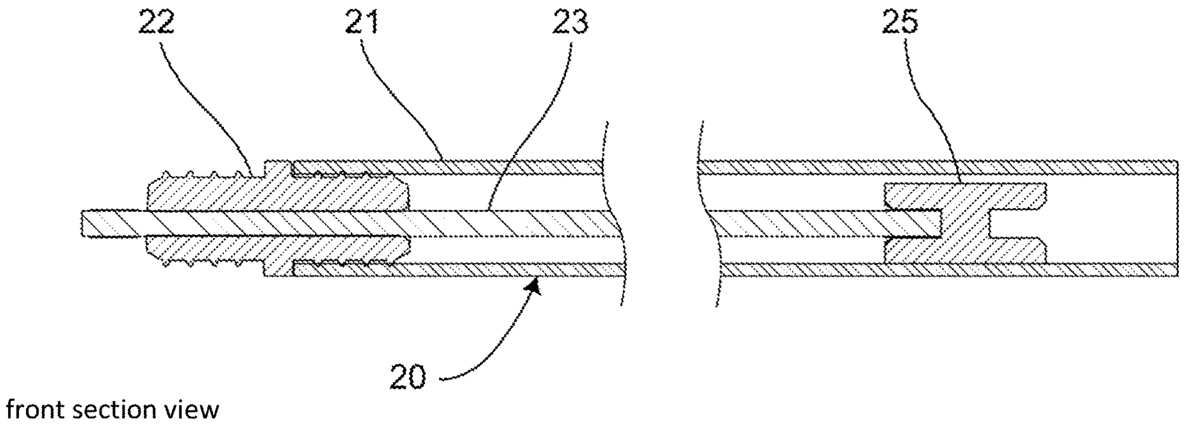
FIG. 4 illustrates an example segment cross-sectional view, according to aspects of the disclosure.

FIG. 4 illustrates an example segment cross-sectional, partial view showing the male and female ends. The elements in FIG. 4 have been described in other figures.

Figure 5:
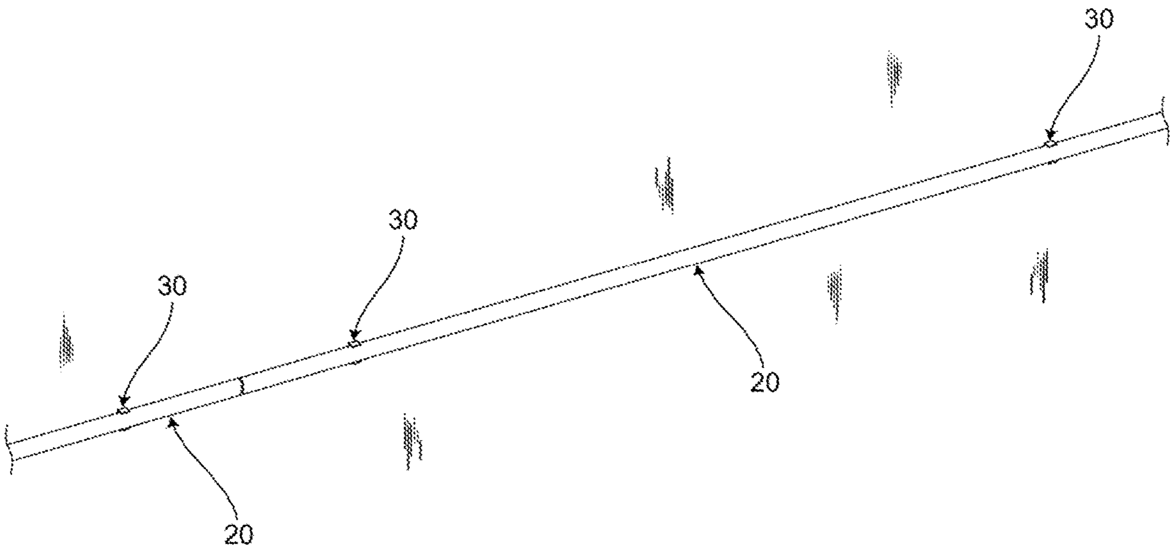
FIG. 5 illustrates an example of segments connected together and attached to a wall, according to aspects of the disclosure.

FIG. 5 illustrates an example of segments connected together and attached to a wall via clips. The elements in FIG. 5 have been described in other figures.

Figure 6:
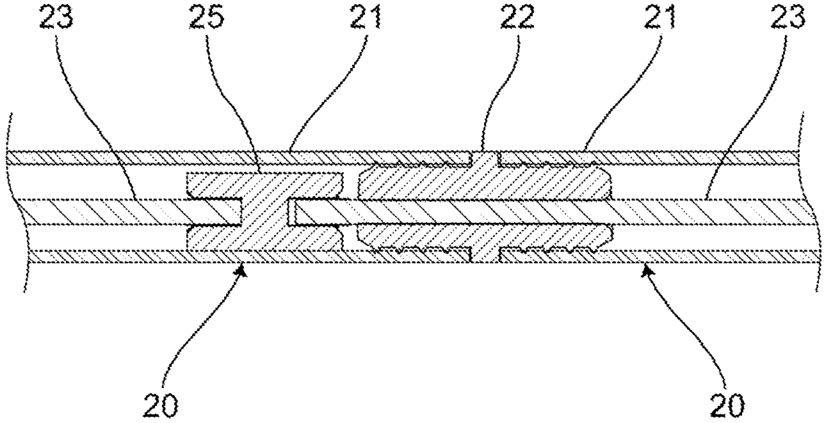
FIG. 6 illustrates an example of a partial, enlarged, cross-sectional view of two segments connected together, according to aspects of the disclosure.

FIG. 6 illustrates a partial, enlarged, cross-sectional view of two segments connected together. The circuit boards plug into the connector. The seal seats into the tube on the left and the tube on the right. The elements in FIG. 6 have been described in other figures.

Figure 7:
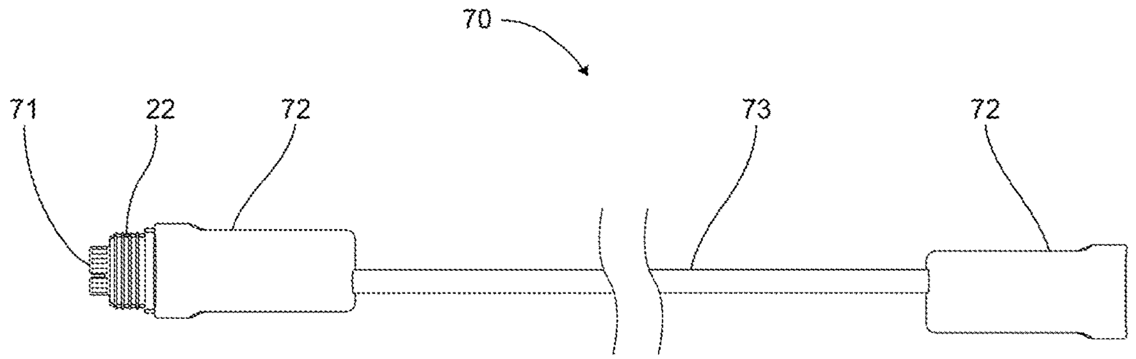
FIG. 7 illustrates an example extension cable segment, according to aspects of the disclosure.

FIG. 7 illustrates an example extension cable segment. The extension cable can connect two segments (e.g., around corners or spanning two roofs). The extension cable can comprise at least one of any or all of the following components:

22. Seal—see FIG. 2.

71. Circuit Board—circuit board can connect wires of the cable to a segment.

72. Covers—can make a water-tight connection with the seal and/or the cable.

73. Electrical Cable—wires inside this cable can carry electrical power and/or signals.

Figure 8:
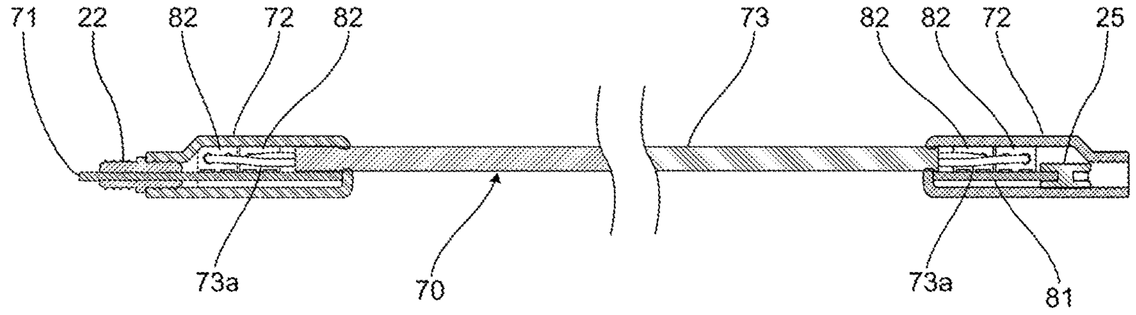
FIG. 8 illustrates a partial, cross-sectional view of the example extension cable segment, according to aspects of the disclosure.

FIG. 8 illustrates a partial, cross-sectional view of the example extension cable segment of FIG. 7. The extension cable segment can comprise at least one of any or all of the following components:

22. Seal—see FIG. 2.

25. Connector—see FIG. 2.

71. Circuit Board—see FIG. 7.

72. Covers—see FIG. 7.

73. Electrical Cable—see FIG. 7.

73*a*, Cable wires—wires of the cable exposed and inserted into connectors (82).

81. Circuit board—circuit board can connect wires of the cable to a segment.

82. Connectors—electrically connect cable wires to a circuit board.

Figure 9:
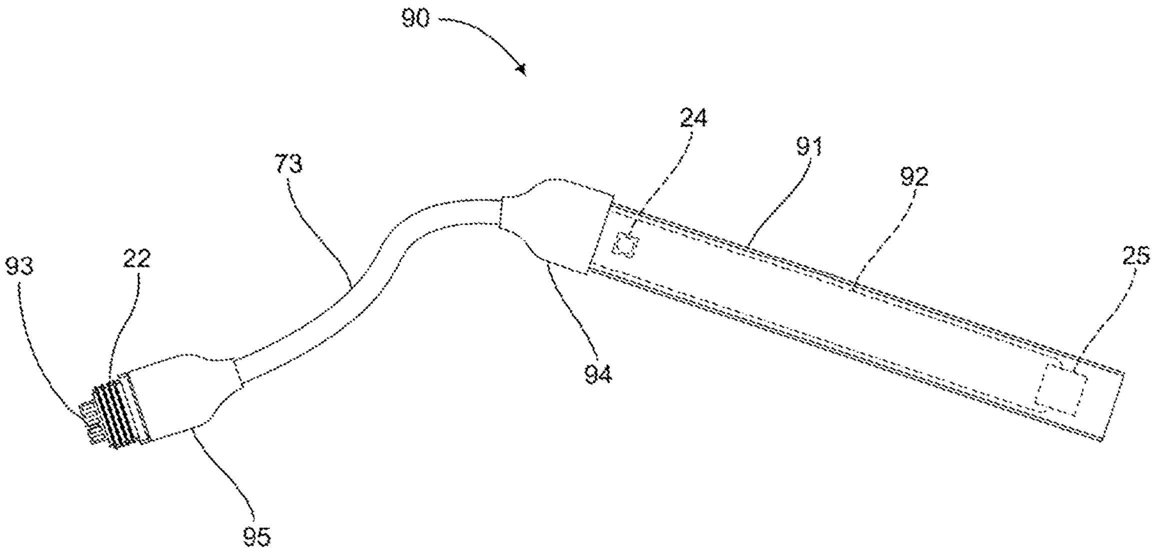
FIG. 9 illustrates an example peak segment, according to aspects of the disclosure.

FIG. 9 illustrates an example peak segment. This can be a segment that ends with one electric light (e.g., item 24, at the vertex of the angle, for example the roof peak). A cable can exit this end and a plug in on the end of the cable can connect to the next segment. The peak segment can comprise at least one of any or all of the following components:

22. Seal—see FIG. 2.

24. Electric Light—see FIG. 2.

25. Connector—see FIG. 2.

91. Tube—a short length of tube, see FIG. 2.

73. Electrical Cable—see FIG. 7.

92. Circuit Board—can be a rigid or flexible electrical insulator with traces that conduct electrical power and/or signals.

93. Circuit Board—can connect wires of the cable to a segment.

94. Cover—can make a water-tight connection with a seal and a cable.

95. Cover—can make a water-tight connection with a tube and a cable.

Figure 10:
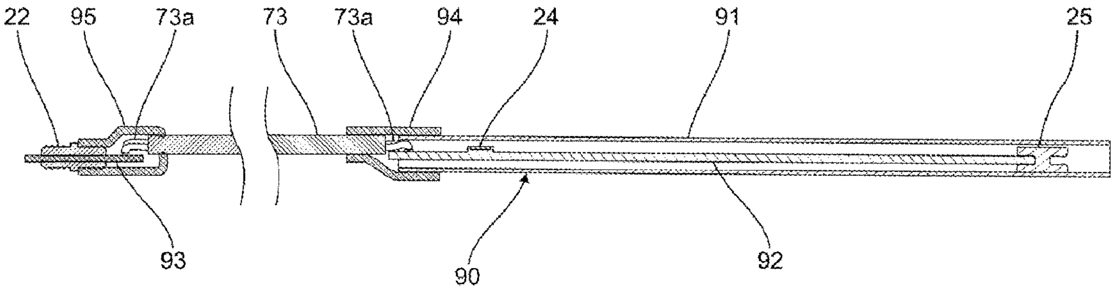
FIG. 10 illustrates a partial, cross-sectional view of an example peak segment, according to aspects of the disclosure.

FIG. 10 illustrates a partial, cross-sectional view of the peak segment of FIG. 9. The elements in FIG. 10 have been described in other figures.

Figure 11:
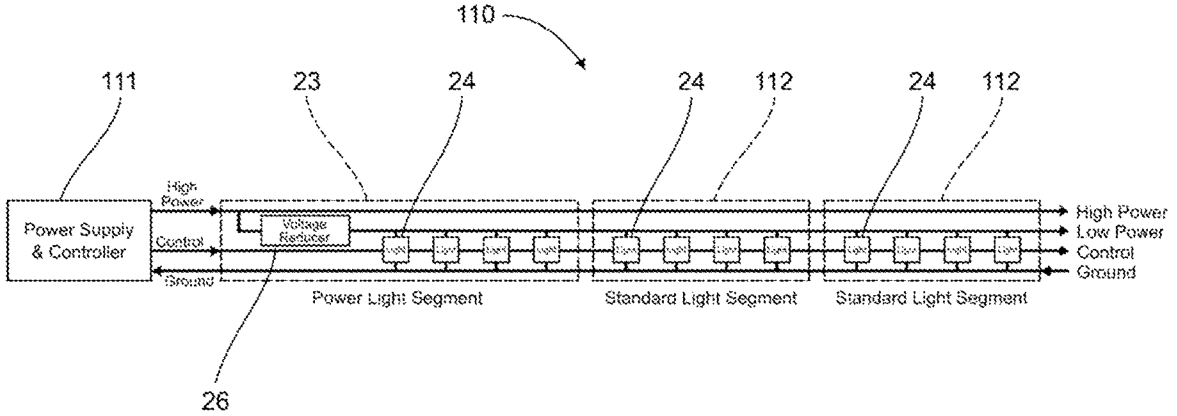
FIGS. 11 and 12 illustrate example block diagrams, according to aspects of the disclosure.

FIG. 11 illustrates an example block diagram. The circuit board segments can have one or more electric lights and pass Power Rail, Control and Ground.

23. Power Segment—can reduce the high power rail voltage to a level suitable for the electric lights (e.g., 5 Volts). The system can start with a power segment. One power segment can provide a certain amount of volt power (e.g., 5 Volts) for several standard segments.

24. Electric Light—see FIG. 2.

111. Controller—supplies power and control signals to the segments.

112. Standard Segment—can receives 5 Volt power from a power segment. The voltage converter (e.g., 5 volt converter, but could be any low voltage (e.g., less than 50 volts in some embodiments)) can be used in a delayed sequence to reduce in-rush current.

Figure 12:
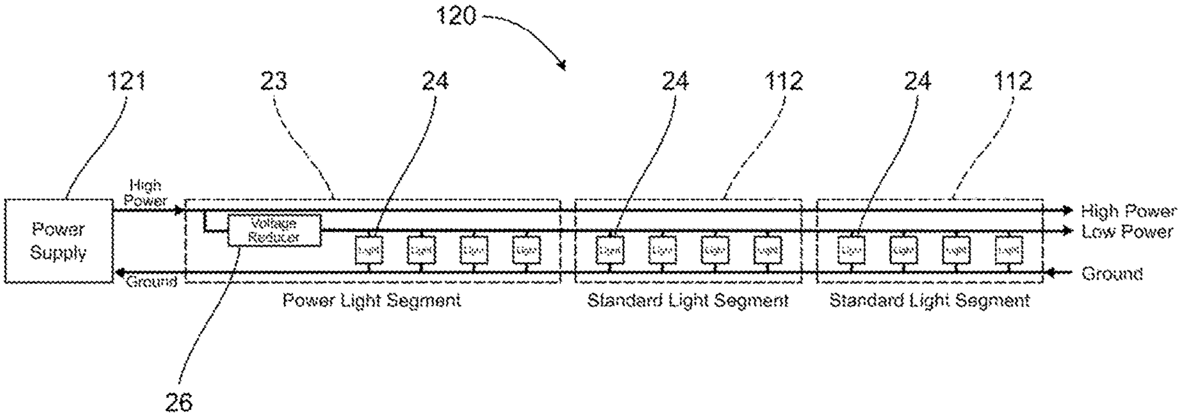

FIG. 12 illustrates an example block diagram similar to FIG. 11 except without control capability. Note that 121 in FIG. 12 can be a power supply that can supply power to the segments.

Figure 13:
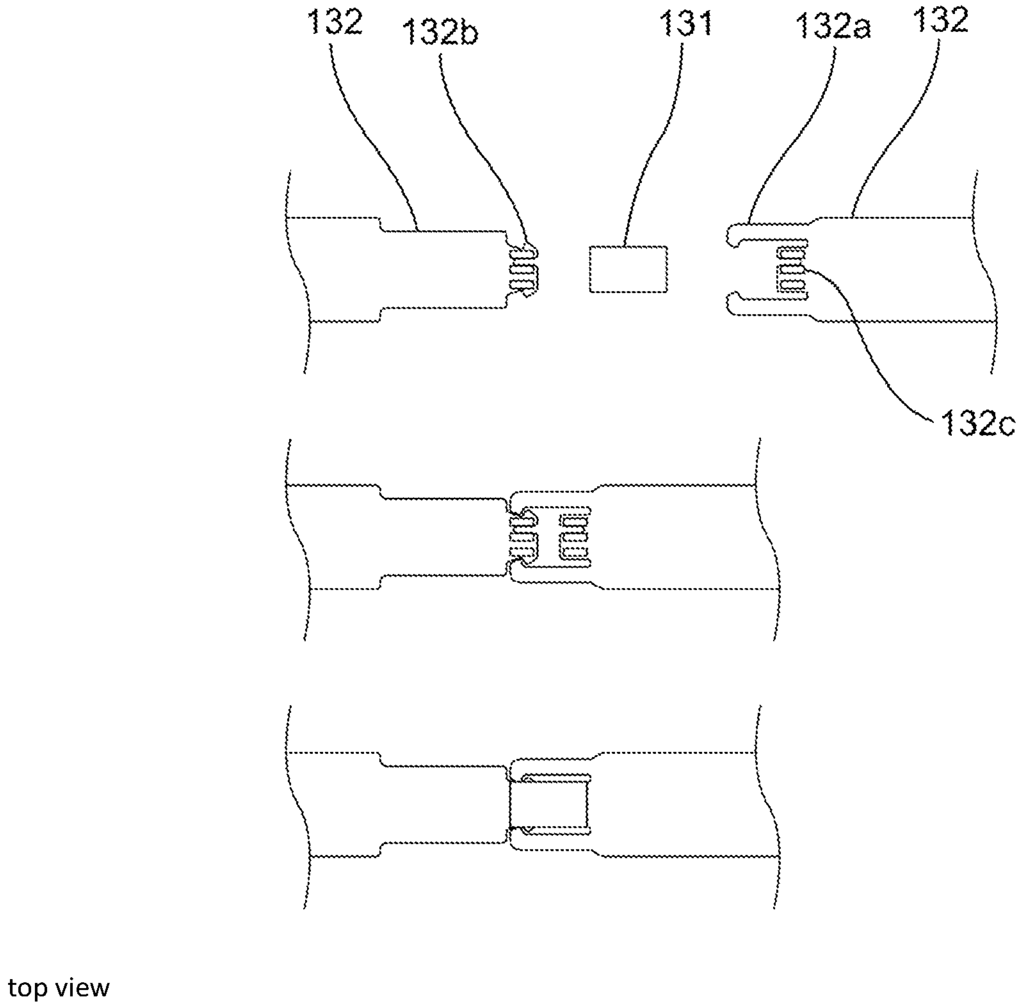
FIG. 13 illustrates an example latching system, according to aspects of the disclosure.

FIG. 13 illustrates a latching system, which can help keep segments connected in some aspects of the disclosure. This is an alternate design of the circuit board end shown in FIG. 2.

131. Connector—see FIG. 2.

132. Circuit Board—can be a rigid or flexible electrical insulator with traces that conduct electrical power and/or signals.

132*a*. Latching Arm—feature on one end of the circuit board with a hook feature to grip the latch feature on the other end of the circuit board. When two circuit boards are pushed together the arm flexes so the hook can pass over the latch feature.

132*b*. Catch—feature on one end of the circuit board designed to be gripped by the latching arm.

132*c*. Pad—Electrically conductive area on the circuit board which connects to the terminals of the connector.

Figure 14:
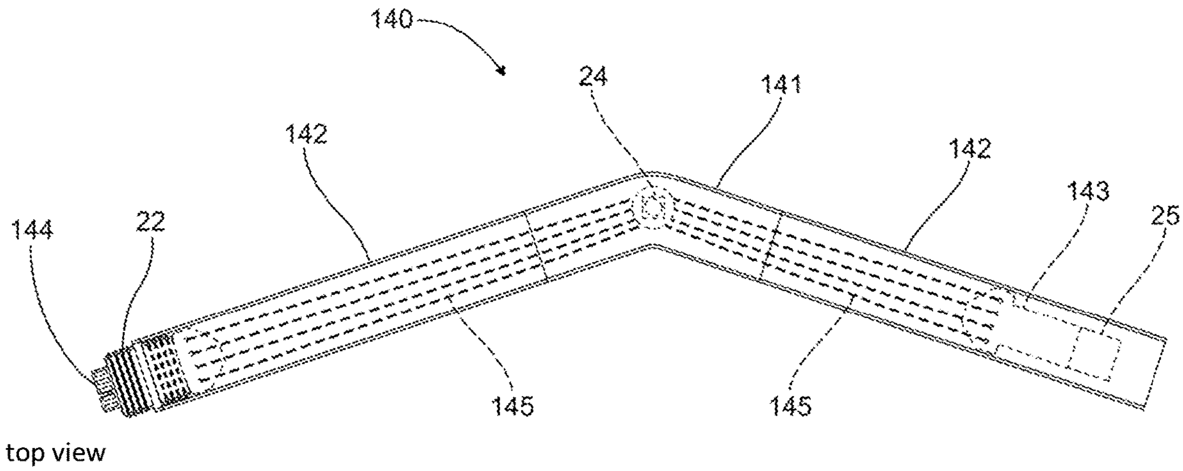
FIG. 14 illustrates another example peak segment, according to aspects of the disclosure.

FIG. 14 illustrates an alternate example peak segment. This can be a segment with one electric light (e.g., item 24, at the vertex of the angle, for example the roof peak). The electric light can be electrically connected to the circuit boards on each end by, for example, individual wires, a cable, or a flexible or rigid circuit board. A clear or translucent elastomic center part attaches to both tubes with the electric light embedded in the elastomeric material. The elastomeric middle allows the peak to flex across a range of angles (for example, to match the angle of a roof peak). The peak segment can comprise at least one of any or all of the following components:

22. Seal—see FIG. 2.

24. Electric Light—see FIG. 2.

25. Connector—see FIG. 2.

141. Elastomer center—attaches to both tubes with the electric light embedded in the elastomeric material.

142. Tube—a short length of tube, see FIG. 2.

143. Circuit Board—can be a rigid or flexible electrical insulator with traces that conduct electrical power and/or signals.

144. Circuit Board—can be a rigid or flexible electrical insulator with traces that conduct electrical power and/or signals.

145. Wires—can make electrical connection to/from the electric light to the circuit boards. Wires can also be a cable, or flexible or rigid circuit board.

In some aspects of the disclosure, a circuit board segment of the pcb can receive a signal(s) that indicate(s) what color of lights to display. In some aspects, the colors can comprise: red, white, red greed blue (RGB), red green blue white (RGBW), red green blue warm white (RGBWW), or red green blue cool white (RGBCW), or any combination thereof. In some aspects, the colors can comprise: red, white, green, blue, white, warm white, or cool white, or any combination thereof. In some aspects, the circuit board segment can receive a signal(s) indicating how bright to display the lights.

Example Assembly Instructions

Example Segment Assembly:
(see FIGS. 2 & 4)

1. Can put connecter (e.g., AVX 00-9159-BTB and/or any known by those of ordinary skill in the art) on end of circuit board.
2. Can put seal on other end of circuit board.
3. Can slip circuit board into tube until seal is fully seated.

Example of Attaching Segments to Surface (e.g., a Wall):
(see FIGS. 2, 3 & 5)

1. Can fasten two or more clips to the wall with a screw (e.g., #4 flat head wood screw and/or any known by those of ordinary skill in the art).
2. Can snap segment into clips.
3. Can attach segments with double side adhesive tape.

Example Extension Cable Assembly:
(see FIGS. 7 & 8)

1. Can cut cable (e.g., Alpha Wire Xtra-Guard 2, 25004 BK005) to length and/or can strip cable jacket from each end.
2. Can insert wires into connectors on circuit boards (e.g., each end).
3. Can place cover (72) over circuit board, half of the seal, or end of cable, or any combination thereof.
4. Can place cover (72) over circuit board, end of segment tube, or end of cable, or any combination thereof.

Example Peak Segment Assembly:
(see FIG. 7)

1. Can cut cable (e.g., Alpha Wire Xtra-Guard 2, 25004 BK005) to length and/or can strip cable jacket from each end.
2. Can insert wires into holes in circuit boards (e.g., each end) and/or can solder in place.
3. Can place cover over circuit board on cable end.
4. Can place cover over end of tube.

Example Alternate (Flexible) Peak Segment Assembly:
(see FIG. 14)

1. Can cut wires to length and/or can strip wires each end.
2. Can insert wires into holes in circuit boards (e.g., each end) and/or can solder in place.
3. Can connect wires to electric light.
4. Can place wires, circuit boards and electric light in tubes.
5. Can mold elastomer over electric light and into ends of tubes.

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term “at least one” may often be used in the specification, claims and drawings, the terms “a”, “an”, “the”, “said”, etc. also signify “at least one” or “the at least one” in the specification, claims and drawings.

Finally, it is the applicant’s intent that only claims that include the express language “means for” or “step for” be interpreted under 35 U.S.C. 112(f). Claims that do not expressly include the phrase “means for” or “step for” are not to be interpreted under 35 U.S.C. 112(f).

The invention claimed is:

1. A light system, comprising:

a segment comprising:

a tube comprising an electric light;

a printed circuit board (PCB), the PCB configured to attach to a seal on one end of the PCB, the one end of the PCB extending through the seal to an outside of the tube, and the PCB configured to attach to a connector on an opposite end of the PCB; wherein only the connector and the seal attach the PCB to the tube;

wherein the segment is further configured to contain a high power rail with a voltage reducer that drops a voltage level of the high power rail.

2. The light system of claim 1, wherein the tube is translucent.

3. The light system of claim 1, wherein the tube is clear.

4. The light system of claim 1, wherein the connector is a board-to-board connector.

5. The light system of claim 1, wherein a regulator drops the voltage level to that of the electric light.

6. The light system of claim 1, wherein the voltage level is dropped lower than 50 volts.

7. The light system of claim 1, wherein the light system comprises multiple segments that connect together.

8. The light system of claim 1, wherein the electric light faces a top of the tube.

9. The light system of claim 1, further comprising an extension cable segment.

10. The light system of claim 1, wherein a peak segment is configured such that the electric light is at the end of the peak segment.

11. The light system of claim 3, wherein a peak segment comprises a flexible cable configured to attach to the segment.

12. The light system of claim 3, wherein a peak segment is molded with a flexible translucent material.

13. The light system of claim 1, wherein a clip is used to mount the tube on a surface.

14. The light system of claim 1, wherein the light system is configured to be used outdoors.

15. The light system of claim 1, wherein the light system is configured to be used indoors.

16. The light system of claim 1, wherein the light system is configured to be used indoors and outdoors.

17. The light system of claim 1, herein the seal is attachable on a narrow end of the PCB.

18. The light system of claim 1, wherein the PCB slides into the tube until a stop ridge of the seal connects the PCB to the LED tube.

19. The light system of claim 1, wherein the connector is configured to attach a PBC from another segment.

20. The light system of claim 1, wherein the segment further comprises a latching feature configured to hold the segment together with another segment.

21. The light system of claim 1, wherein the seal connects the tube to another tube.

22. The light system of claim 1, wherein a circuit board segment of the PCB receives signals that indicate what color of light to display.

23. The light system of claim 1, wherein a circuit board segment of the PCB receives signals to indicate how bright to display a light.

24. The light system of claim 1, wherein the tube is mounted to a surface using a mounting mechanism.

25. The light system of claim 24, wherein the mounting mechanism comprises at least one of: a clip, adhesive, and a screw.

26. The light system of claim 1, wherein the electric light comprises one or more light emitting diodes (LEDs).

27. The light system of claim 1, wherein the electric light comprises a plurality of electric lights of at least one color.

28. The light system of claim 27, wherein the at least one color comprises at least one of: red, white, red greed blue (RGB), red green blue white (RGBW), red green blue warm white (RGBWW), and red green blue cool white (RGBCW), or any combination thereof.

29. The light system of claim 27, wherein the at least one color comprises at least one of: red, white, green, blue, white, warm white, and cool white, or any combination thereof.

30. The light system of claim 1, wherein the voltage reducer is used in a delayed sequence to reduce in-rush current.

* * * * *